United States Patent [19]

Crissy et al.

[11] Patent Number: 4,475,855
[45] Date of Patent: Oct. 9, 1984

[54] CARGO CONTROL CART ANCHOR

[75] Inventors: Charles F. Crissy; Paul M. Holmes, both of Jackson, Mich.

[73] Assignee: Aeroquip Corporation, Jackson, Mich.

[21] Appl. No.: 392,544

[22] Filed: Jun. 28, 1982

[51] Int. Cl.³ .............................................. B61D 45/00
[52] U.S. Cl. .................................... 410/126; 410/120; 410/121; 410/128; 410/140; 248/500
[58] Field of Search .............................. 410/120–122, 410/126–128, 156, 31–43, 145–149, 153, 116, 140, 104, 105, 115, 141; 248/500, 502, 508, 507

[56] References Cited

U.S. PATENT DOCUMENTS

| 776,541 | 12/1904 | Patterson | 410/36 |
| 3,017,679 | 1/1962 | Elsner | 24/265 X |
| 3,984,118 | 10/1976 | Wilson | 410/121 |
| 4,093,303 | 6/1978 | Nelson | 410/51 X |
| 4,120,076 | 10/1978 | Lebre | 410/120 X |

FOREIGN PATENT DOCUMENTS 626203  2/1936  Fed. Rep. of Germany ...... 248/507

Primary Examiner—Robert B. Reeves
Assistant Examiner—Glenn Foster
Attorney, Agent, or Firm—Beaman & Beaman

[57] ABSTRACT

The invention pertains to an anchor for cargo carts wherein transported carts are restrained against movement within a cargo compartment. The anchor consists of a jack type implement utilizing a screw interconnecting telescoping tubular sections wherein the anchor includes a fitting attachable to permanently installed cargo control track within the cargo compartment. The anchor is formed of economically producible components, and is readily attached to, or removed from, the track by orienting the telescoping sections in a predetermined manner to the track.

4 Claims, 7 Drawing Figures

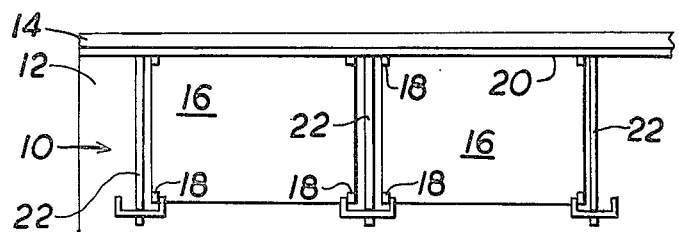
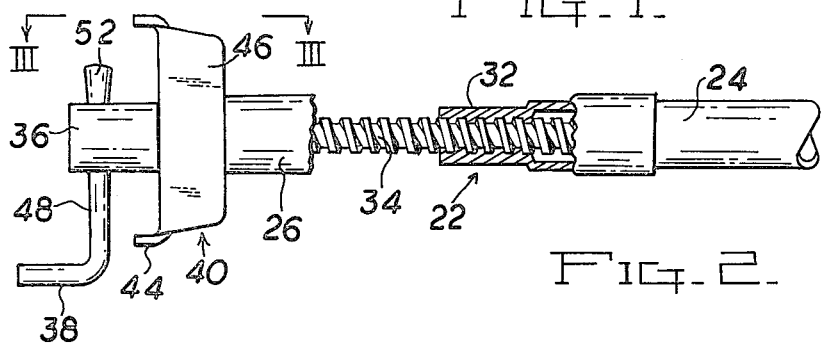
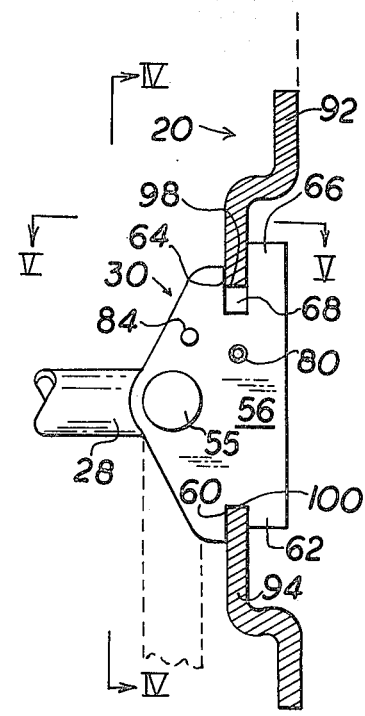
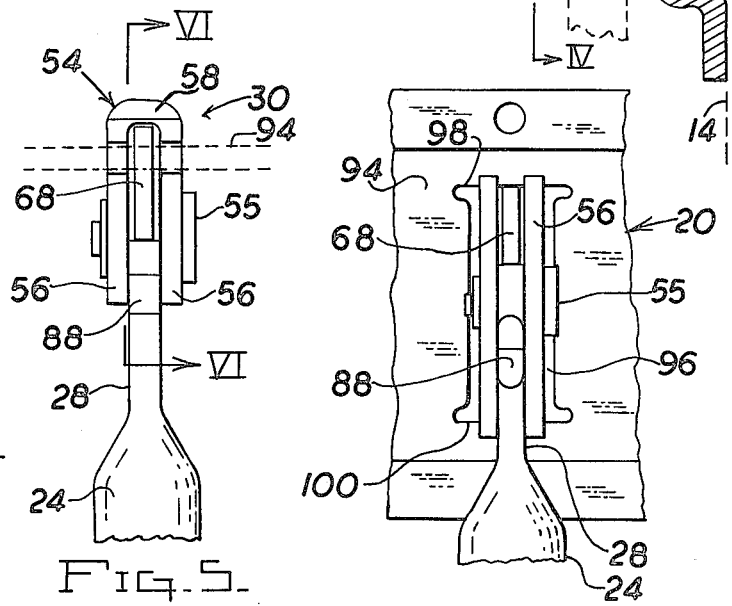
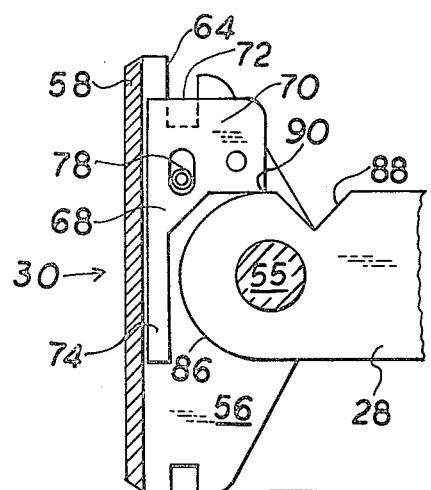
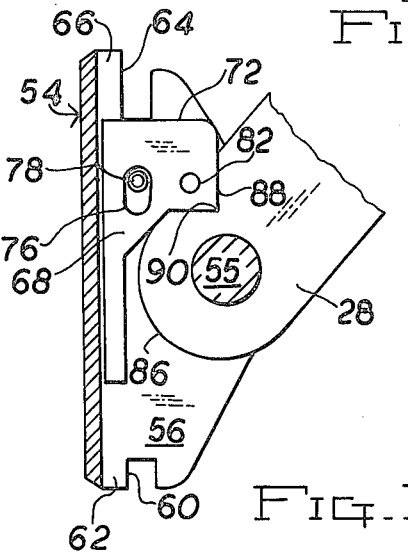

CARGO CONTROL CART ANCHOR

BACKGROUND OF THE INVENTION

Material handling carts mounted upon wheels must be anchored when transported within the cargo compartment of a truck, van, boxcar, or the like. For instance, shelved carts are widely used in the transportation and distribution of bread and bakery products, wherein the carts are loaded and then wheeled upon a truck for retail bread distribution. A variety of systems have been used to anchor the carts within the cargo compartment, including strap and buckle systems, and present cargo cart anchors are difficult to maintain, expensive, and do not have the desired versatility of installation and operation.

It is an object of the invention to provide a cargo cart anchor which may be readily used with a conventional cargo control track wherein the anchor may be readily attached to, or removed from, the track, but cannot be accidentally removed therefrom.

Another object of the invention is to provide a cargo cart anchor which is simple to operate, and wherein a single anchor is capable of being associated with two adjacent carts.

Yet another object of the invention is to provide a cargo cart anchor of economical and rugged construction, utilizing stamped and readily fabricated components.

A further object of the invention is to provide a cargo cart anchor employing a screw operation to produce the anchoring force, and wherein vibration will not release the anchor.

An additional object of the invention is to provide a cargo cart anchor of a relatively rigid construction wherein the anchor pivots to a non-use storage condition adjacent the cargo compartment wall when not in use.

The cart anchor in accord with the invention includes a pair of telescoping tubular members interconnected by a screw operated through a hand crank. A hook is mounted upon the movable telescoping component for engaging cart structure. The fixed telescoping conduit supports a fitting whereby the anchor may be readily attached to a cargo control track mounted upon the wall of the cargo compartment.

The fitting includes a slotted U-shaped element adapted to be inserted into the cargo control track, and the fitting is locked to the track by means of a sliding retainer which prevents vertical fitting displacement to a position which would permit the fitting to be removed from the track.

The retainer is operated by the telescoping components of the cart anchor wherein raising of these components to an unusual predetermined position permits the retainer to be displaced to a position wherein the fitting may be removed from the cargo control track. This operation of the retainer is accomplished through a cam surface formed on the telescoping section pivotally affixed to the fitting.

The pivotal interconnection between the fitting and the telescoping components permits the telescoping components to pivot downwardly to a stored location adjacent the cargo compartment wall when the anchor is not in use.

BRIEF DESCRIPTION OF THE DRAWINGS

The aforementioned objects and advantages of the invention will be appreciated from the following description and accompanying drawings wherein:

FIG. 1 is a top, plan, partial, schematic view of a cargo compartment illustrating the orientation of the anchor to cargo carts, FIG. 2 is an elevational view, partially in section, showing the anchor in accord with the invention, the stored position being shown in dotted lines, FIG. 3 is a top, plan, detail view as taken along Section III—III of FIG. 2, FIG. 4 is an elevational, detail view of the fitting and of the anchor along Section IV—IV of FIG. 2 illustrating the anchor in the storage position, FIG. 5 is a top plan view of the fitting end of the anchor taken along Section V—V of FIG. 2, the track being shown in dotted lines, FIG. 6 is an elevational sectional view taken through the fitting along Section VI—VI of FIG. 5 illustrating the retainer in the operative condition, and FIG. 7 is a view similar to FIG. 6 illustrating the retainer in the release position for removing the anchor fitting from the cargo control track.

DESCRIPTION OF THE PREFERRED EMBODIMENT

In FIG. 1 a schematic representation of the use of the anchor in accord with the invention is shown. A cargo compartment is illustrated at 10, and represents a plan view of a truck or boxcar compartment wherein the floor is shown at 12, and a vertical side wall at 14. The carts to be anchored are of a rectangular plan configuration as shown at 16, and these carts may be of the shelf type commonly used in the distribution of bread and bakery products. The carts are each mounted upon their own wheels, usually caster wheels, and are easily movable. The carts include vertical corner columns 18 upon which the shelves are supported.

A cargo control track 20 of known construction, such as apparent in FIGS. 2 and 4, is mounted upon the vertical wall 14 in the usual manner. The track 20 will be parallel to the floor 12, and may be three or four feet above the floor. The anchor 22 in accord with the invention is affixed at one end to the track 20, and the other end of the anchor includes a hook which hooks around the corner columns 18 of the carts 16, and upon tensioning of the anchor the associated carts are forced against the wall 14 and track 20 holding the carts at the desired location in the cargo compartment. As apparent from FIG. 1, the anchors 22 are located at the ends of the carts wherein only a single cart corner column is engaged by the anchor, but when the anchors are located between adjacent carts 16 a single anchor is used to engage two carts. Thus, the number of anchors required is one greater than the number of carts being anchored.

The overall construction of the cart anchor in accord with the invention is best appreciated from FIG. 2. The anchor 22 includes an inner tubular section 24 over which telescopes the movable outer tubular section 26. The inner end of the section 24 is flattened at 28 and is pivotally connected to a fitting, generally indicated at 30, by pivot pin 55, and the other end of the tubular section 24 is inwardly swaged to define a reduced diametrical section 32 which is internally threaded for cooperation with the threaded shaft 34 having a head 36 at its outer end upon which the crank handle 38 is mounted.

The outer telescoping tubular section 26, at its inner end, closely slides over the section 24, and the outer end of the section 26 supports a sheet metal hook 40 which is welded to the end of the section. The hook 40 is of an elongated form extending at right angles to the length of the section 26 and includes body portion 42 reinforced by ribs 44, and flanges 46 extend from the end of the body portion in a direction parallel to the section 26 for hooking around the corner columns of the carts 16. The screw shaft head 36 extends toward and bears against the outer surface of the hook body 42, FIG. 2, wherein rotation of the screw shaft and head by the handle 38 in a clockwise direction will force the hook 40 and section 26 to the right, FIG. 2, toward the fitting 30 to "tension" the anchor against the cart associated therewith. The handle 38 includes portion 48 which is slidably received within a transverse hole 50 defined within head 36, and the portion 48 is enlarged at 52 to retain the handle within the head. Under gravitational forces the handle 38 will assume the position shown in FIG. 2 wherein the major weight of the handle is disposed below the axis of the threaded shaft 34.

The fitting 30 includes a U-shaped body 54 pivotally connected to section 24 by a pivot pin 55 having legs 56 interconnected by base portion 58, FIG. 5. The legs each include an aligned lower notch 60 adjacent the "short" base extension 62, and each of the legs includes an upper aligned notch 64 adjacent the long base extension 66. The depth of the notches 64 is greater than the depth of the notches 60, for cooperation with the opening within the cargo control track, as later described.

A sliding retainer plate 68 is located intermediate the fitting legs 56, as best illustrated in FIGS. 6 and 7. The retainer includes a head 70 having an upper edge 72, and a lower extension 74 is disposed adjacent the base 58. The head 70 is provided with an elongated vertical slot 76 in which the roll pin 78 is received, and the fitting legs 56 also include holes 80 which support the roll pin. In this manner the roll pin retains the retainer 68 between the legs. Also, the head 70 is provided with a hole 82 which will align with holes 84 defined in each of the fitting legs for a purpose later described.

The configuration of the flattened end of tube section 24 is shown in FIG. 6, wherein the fitting end includes a cylindrical cam surface 86 concentric with the axis of the pivot pin 55. A notch 88 is defined in the upper edge of the flattened section 28 whereby upon pivoting of the tubes 24 and 26 to approximately 45° from the vertical, as shown in FIG. 7, the corner 90 of the retainer head 70 may be received within the notch 88 permitting the retainer to lower to the position shown in FIG. 7 wherein the retainer edge 72 will be in substantial alignment with the lowermost edge of the upper notches 64.

The cargo control track 20 is of conventional construction, and may be of the type sold by the assignee, Aeroquip Corporation, Series A or E. The track includes flanges 92 in which holes are defined for attaching the track to the cargo compartment wall 14. The offset track portion 94 extends from the wall and has a plurality of generally rectangular openings 96 defined therein at equally spaced intervals along the portion 94. The rectangular openings 96 include an upper edge 98, a lower edge 100, and lateral sides defined by inwardly formed flanges, not shown.

To mount the cargo control anchor 22 to the track 20 the sections 24 and 26 are pivoted with respect to the fitting 30 to the position shown in FIG. 7 wherein the retainer corner 90 is received within the notch 88. This orientation permits the retainer, under gravity, to fall to its lowest position providing access to the maximum "depth" of the upper notches 64. Thereupon, the fitting extension 66 may be inserted into the track opening 96 behind the edge 98, and the track edge 98 is then received within the notches 64. As the retainer 68 is in its lowermost position the fitting 30 may be raised its maximum extent within the track opening 96, which permits the lower fitting extension 62 to pass over the lower track opening edge 100 and align the notches 60 with the edge 100. Thereupon, the fitting 30 is lowered to the position shown in FIG. 2, and the sections 24 and 26 are pivoted to a horizontal position, or lower, which causes the cam surface 86 to engage the retainer corner 90 raising the retainer 68 to the position shown in FIGS. 2 and 6. When the retainer is in the "locked" condition of FIGS. 2 and 6 the fitting 30 cannot be raised within the track opening 96 a sufficient distance to remove the lower notches 60 from the track opening due to the engagement of retainer edge 72 with the opening edge 98, and the anchor 22 is firmly locked to the cargo control track.

After the cart anchor has been affixed to the cargo control track at the desired location the operator unscrews the threaded shaft 34 sufficiently to position the hook 40 around the corner column, or columns, or a cart, or carts, to be anchored. Thereupon, the shaft is tightened by means of the handle 38 and the hook 40 and section 26 will be forced toward the fitting 30 and the cargo wall 14. Tightening of the screw continues until the cart 16 is snugly forced against the wall. This process is repeated at each cargo anchor location.

As the handle portion 48 of the crank handle is slidably located within the screw shaft head 36 the majority of the weight of the crank handle is located below the axis of the shaft, and vibration will not rotate the screw shaft due to the weight of the handle as the handle acts as a counterweight.

When it is desired to remove the anchor 22 from a cart 16, the threaded shaft is rotated by the crank handle sufficiently to permit the hook 40 to be released from the cart corner column. Thereupon, the hook 40 and section 26 may be rotated 90° to permit the sections 24 and 26 to pivot to the stored dotted line position of FIG. 2 between the carts, and the carts may be readily wheeled from the cargo compartment 10. The cart anchors 22 will normally be mounted at the desired location upon the track 20, and upon reloading the carts the anchors are pivoted to the substantially horizontal operative position, and the anchoring process repeated, as described above. If it is desired to remove or relocate an anchor relative to the track 20, the sections 24 and 26 are pivoted upwardly about the pivot pin 55 to the position of FIG. 7 wherein the notch 88 will align with the corner 90 of the retainer 68, and this orientation will permit the retainer to drop to the position of FIG. 7, permitting the fitting 30 to be raised within the track opening 96 removing the notches 60 from the track opening, and permitting the fitting extension 62 to pass through the opening over lower edge 100, and thereupon, the fitting is lowered, the notches 64 removed from the track edge 98, and the fitting is removed from the track opening 96.

If it is desired that retainer 68 be locked in its notch blocking position of FIG. 6 a wire or pin can be inserted into aligned holes 82 and 84, and such wire or pin will prevent the retainer from lowering into notch 88 even though the notch is aligned with corner 90.

From the above description it will be appreciated that the operation of the cart anchor is simple and easily accomplished. Locking to the cargo control track is positive and easily accomplished, and yet accidental removal of the anchor from the cargo control track is highly unlikely as the telescoping sections must be raised to an unusual position. Unloosening of the threaded shaft due to vibration is prevented by the counterweight effect achieved by the crank handle, and the use of stamped and conventional tube components reduces costs. For instance, the swaging of the section 24 at 32 eliminates the need for a separate nut or threaded element.

It is appreciated that various modifications to the inventive concepts may be apparent to those skilled in the art without departing from the spirit and scope of the invention.

We claim:

1. A cargo control anchor comprising, in combination, an elongated anchor body having first and second ends comprising a first tube telescopingly mounted upon a second tube for relative axial displacement thereto, a threaded shaft interconnecting said tubes whereby rotation of said shaft axially displaces said tubes relative to each other to vary the length of said body, a hook member mounted upon said body first and adapted to engage the cargo to be controlled, a support fitting mounted upon said body second end, said support fitting comprising a cargo control track insert having upper and lower notches defined therein for receiving the edges of a cargo control track opening, extensions defined upon said insert adjacent said notches adapted to maintain the insert within a track opening upon the insert being oriented within the track opening in a predetermined manner, a retainer movably mounted upon the insert movable between a notch blocking position and a release position wherein said notch blocking position said retainer restricts the depth of one of said notches to retain the insert within a track opening and in the release position increases the depth of said one notch to permit the insert to be removed from the track opening, retainer operating means mounted on said insert selectively moving said retainer between said notch blocking and release positions, a pivot pin mounted upon said support fitting pivotably mounting said body second end upon said support fitting, and a handle located at said body first end operatively connected to said threaded shaft for rotating said shaft.

2. In a cargo control anchor as in claim 1, wherein said retainer operating means comprises a cam pivotally mounted upon said insert.

3. In a cargo control anchor as in claim 2, said cam being defined upon said body second end whereby pivoting of said anchor body relative to said fitting controls displacement of said retainer between its notch blocking and release positions.

4. In a cargo control anchor as in claim 3, said body second end comprising the outer end of said second tube, said second tube outer end being flattened and having a circular periphery concentric with said pivot pin comprising said cam, and a notch defined in said periphery adapted to receive a portion of said retainer at a predetermined angular relationship between said fitting and anchor body permitting said retainer to be displaced to its release position.

* * * * *